United States Patent [19]
Brown

[11] 3,753,373
[45] Aug. 21, 1973

[54] TRANSDUCER SYSTEM
[75] Inventor: Neil L. Brown, El Cajon, Calif.
[73] Assignee: The Bissett-Berman Corporation, Santa Monica, Calif.
[22] Filed: Oct. 22, 1965
[21] Appl. No.: 501,731

[52] U.S. Cl............. 73/398 C, 73/362 R, 317/247, 323/63, 323/93, 324/61 R
[51] Int. Cl....... G01k 5/52, G01l 9/12, G01r 27/26
[58] Field of Search.................. 73/362 R, 362 CP, 73/398 C; 317/247, 248; 323/63, 68, 93; 324/61

[56] References Cited
UNITED STATES PATENTS

| | | | |
|---|---|---|---|
| 2,031,846 | 2/1936 | Muth | 317/247 X |
| 2,207,783 | 7/1940 | Carlson et al. | 317/247 |
| 2,431,841 | 12/1947 | Storm | 324/61 |
| 2,651,204 | 9/1953 | Dickinson | 73/398 C |
| 2,655,043 | 10/1953 | Wolfe et al. | 73/398 C |
| 2,714,703 | 8/1955 | Ruderfer | 73/398 C X |
| 2,908,166 | 10/1959 | Johnson | 324/61 X |
| 2,926,247 | 2/1960 | Palmer | 73/362 UX |
| 3,068,700 | 12/1962 | Bourns | 73/398 |
| 3,103,002 | 9/1963 | Pearson | 317/246 X |
| 3,221,247 | 11/1965 | Samuelian | 324/61 |
| 3,311,842 | 3/1967 | Beck | 73/362 X |
| 3,318,133 | 5/1967 | Hahn | 73/362 X |

*Primary Examiner*—Richard C. Queisser
*Assistant Examiner*—Frederick Shoon
*Attorney*—Smyth, Roston & Pavitt

[57] ABSTRACT

This invention relates to a system for measuring the value of a variable capacitor. The capacitor is included in a circuit with a reference capacitor which is connected in series with the variable capacitor. An operational amplifier having a high gain is connected in series with one of the variable and reference capacitors and is connected in parallel with the other one of the variable and reference capacitors. An input voltage is applied to the one of the variable and reference capacitors and an output voltage is derived from the operational amplifier. The relative values of the output and input voltages indicate the relative values of the variable and reference capacitors.

4 Claims, 8 Drawing Figures

United States Patent [19]
Brown

[11] 3,753,373
[45] Aug. 21, 1973

PATENTED AUG 21 1973 3,753,373

INVENTOR
Neil L. Brown

By Smyth, Roston & Pavitt
Attorney

INVENTOR
Neil L. Brown

Fig. 7

TRANSDUCER SYSTEM

This invention relates in general to measurement systems and methods for transducing various parameters into electrical signals. More particularly, the invention relates to a transducer system and the techniques and methods associated therewith whereby the disruptive effects of stray impedances may be minimized to facilitate the use of impedance-type and especially capacitance-type devices to perform the transducing function.

Practically all instrumentation techniques are directed toward the sensing of linear displacement or of phenomena such as temperature, pressure, force or acceleration which are readily convertible into a linear displacement. The most popular sensor for converting linear displacement into an electrical signal which can be used by display, recording, and transmitting apparatus is the resistance strain gauge. These strain gauges are simple to use and inexpensive to install on test structures; but their value in performing precise instrumentation and testing is limited because their performance is unstable with change in temperature and other conditions; and, indeed, strain gauges are sometimes found to drift even at one stable operating point.

Thus it has been found desirable to transduce linear displacement into an electrical signal using some sort of variable impedance sensor besides the usual resistance strain gauge. Since inductance-type gauges would be very heavy and bulky, the natural variable-impedance element for use as a replacement of the resistor is a variable-capacitance type linear displacement gauge or, for short, a capacitance sensor or transducer.

A capacitance transducer functions by having the distance between the two capacitor plates changed in response to changes in the parameter to be sensed to vary the impedance of the transducer. Thus, a capacitance transducer can sense only mechanical movement, and it is desirable that whatever physical parameter is to be sensed should operate on the transducer in such manner as to provide some change in the distance between the capacitor plates. This can be accomplished in a variety of ways that are consistent with the construction of compact and shock-resistant transducers. For example, a temperature sensor can be made using two concentric cylinders of different temperature coefficients of linear expansion (e.g. quartz and aluminum). As temperature varies, the differential of circumference change between the cylinders will result in a change in capacitance therebetween. If each cylinder is electrically connected to act as one plate of a capacitor, the impedance of the capacitor will change accordingly.

Similarly, a pressure transducer can be designed using concentric cylinders of the same material, with the pressure to be measured being applied either between the cylinders or to the outer wall of one or both of the cylinders. As the applied pressure causes new deformations in one or both of the cylinders, the capacitance between the cylinders will change. The imposition of an AC signal across the cylinders and the monitoring thereof will sense these changes in capacitance and thus the change in pressure giving rise to them. In like manner, linear movement, force, acceleration and many other parameters can be sensed using the above-mentioned concentric type of capacitor or the parallel plate type, if only the capacitors are arranged in such a way that change in the parameter varies to space between the two plates.

In spite of the adaptability of capacitance transducers to almost every type of parameter monitoring need, as shown above, capacitance transducers have not been widely used in the past because of the difficulty associated with the effects of stray circuit capacitance and also because of the high impedance characteristic of this type of sensor. Also, previous uses of capacitance transducers have resulted in either poor sensitivity or non-linearity. These problems arise because every lead and terminal of the electrical system in which the capacitance transducer operates acts as a capacitor plate in regard to nearby leads and terminals so that a less than indefinite impedance exists therebetween, especially for high-frequency AC signals.

It is the main purpose and object of the instant invention to provide a capacitance transducer electrical system wherein such inaccuracies and distortion of the information to be sensed by the capacitance transducer are eliminated. The main object in the arrangement of this system is to nullify the effects of the shunt stray capacitances associated with the sensing capacitor in such manner as to make ascertainable the true changes in impedance thereof, which in the past have been almost impossible to derive electrically.

In the achievement of the above and other objects and as a feature of applicant's invention, there is provided a capacitance transducer electrical system wherein all the various stray capacitances occurring in the circuit, whether between one point in the circuit and another point in the circuit, or between a certain point in the circuit and ground, or in parallel with some element in the circuit, are eliminated by various methods. Often the stray capacitances in parallel with circuit elements can be eliminated simply by proper shielding, but capacitances occurring between the various leads and terminals in the circuit and ground are far more difficult to deal with. Accordingly, it is a feature of the invention that applicant connects the sensor capacitor in a capacitance transducing system between the input and output terminals of a high-gain or operational amplifier. At the same time a reference capacitor is coupled in series between the input terminal of the operational amplifier and the drive signal source thereof. As a result of this arrangement only the current flow through the reference capacitor is important to the accuracy of the output signal of the circuit, so that any stray capacitances between the reference capacitor and the input signal source will be irrelevant to the accuracy of the output reading. Because a high-gain amplifier has practically an infinite input impedance, any stray capacitances between the reference capacitor, the sensor capacitor, and the input terminal of the high-gain amplifier will be in parallel with practically a zero voltage and thus will be effectively shorted to ground. Finally, any capacitances between the output terminal of the amplifier, the sensor capacitor, and the output terminal of the circuit will be in parallel with the very low output impedance of the high-gain amplifier and thus will be shunted to ground.

In the detailed description to follow, the general performance of applicant's new circuit as described above will be verified mathematically. Moreover, capacitance transducer systems constructed according to the above-discussed principles have already demonstrated an accuracy within one part in 30,000, even in situations where the stray capacitances rose to be almost equal to the sum of the reference and sensor capacitances.

As another feature of applicant's capacitance transducer system, new and improved sensors are provided for the conversion of various parameters into more accurately sensitive electrical signals.

As another feature of applicant's invention, the capacitance transducer system disclosed herein has improved circuitry for increasing the sensitivity and balance of the readout circuitry of the system.

As another feature of applicant's invention, an accurate digital readout is provided for the transducer system, in order to provide automatic balance and analog-to-digital conversion.

As another feature of applicant's invention, the output of the transducer system may be frequency-modulated by a system which has the unique characteristic that its frequency output is a linear function of the ratio of the output to the input voltages of the basic capacitance transducer system, so that the output reading is unaffected by changes in the input power applied to the sensor capacitor.

Other objects and features of applicant's invention and better understanding thereof may be had by referring to the following description and claims taken in conjunction with the accompanying drawings in which:

Figure 1:
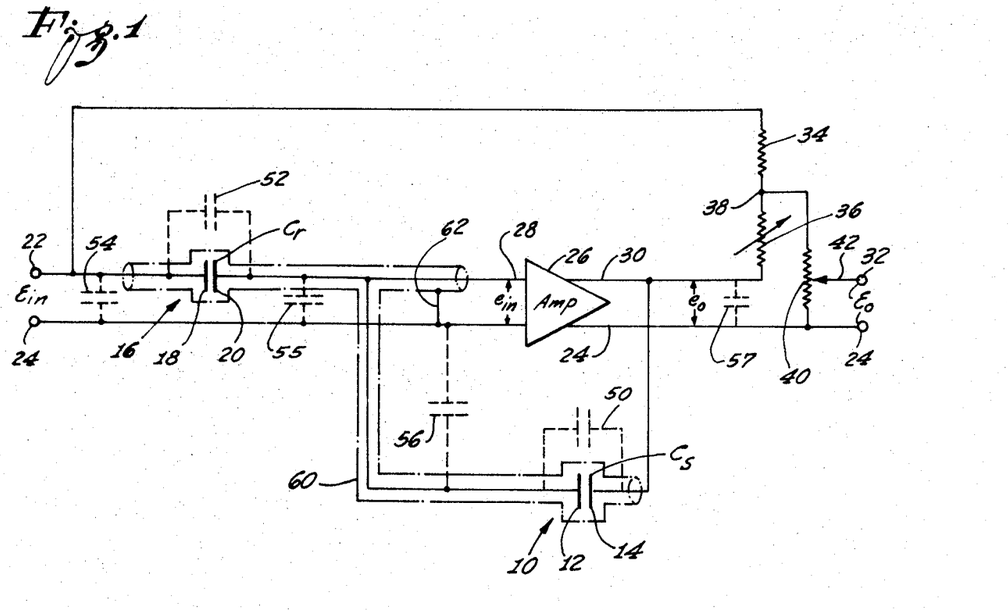
FIG. 1 is a schematic drawing of a capacitance transducer electrical system according to the principles of the instant invention.

Referring to FIG. 1, in the schematic drawing of the capacitance transducer system shown therein the variable capacitance transducer itself is represented as a capacitor at 10. This capacitance transducer 10 has a first plate 12 and a second plate 14. The capacitance transducer 10 is also referred to herein as $C_S$, that is to say, the capacitor sensor. In the schematic of FIG. 1 the reference capacitor referred to above is represented at 16 and has a first plate 18 and a second plate 20. The reference capacitor 16 is also referred to herein as $C_R$.

The circuit of FIG. 1 has an input terminal 22 and a reference terminal 24. In the operation of the circuit a drive signal ($E_{in}$) or input excitation signal is applied across the terminals 22, 24. The first plate 18 of the reference capacitor 16 is connected to the input terminal 22. The second plate 20 in the reference capacitor 16 is connected to an operational amplifier 26 which operates between the reference line 24 and an input lead 28 and an output lead 30. The second plate 20 of the reference capacitor 16 is connected to the input lead 28 while the second plate 14 of the sensor capacitor 10 is connected to the output lead 30. The first plate 12 of the sensor capacitor 10 is connected to the input lead 28, so that the sensor capacitor 10 forms a feedback loop between the output terminal 30 of the operational amplifier 26 and the input terminal 28. The output voltage of the circuit of FIG. 1 is taken between the reference line 24 and an input terminal 32.

In order to permit the circuit to have a zero reading for the desired reference parameter the voltage from the output terminal 30 of the output amplifier is coupled to the output terminal 32 through a first voltage division network comprising a resistor 34 and a variable resistor 36 connected in series between the output terminal of the operational amplifier and the input terminal 22. The voltage at a point 38 between these two resistors is then connected to the output terminal 32 through a variable resistor 40 having a slide 42 which is adjustable to attenuate the output voltage, $E_o$.

The components drawn into the circuit of FIG. 1 in dotted lines are the stray capacitances which are of so much interest in the instant application. To begin with, both $C_S$, the capacitance transducer 10, and $C_R$, the reference capacitor 16, have stray capacitances 50 and 52, respectively, in parallel therewith. Additionally, the performance of the capacitance transducer circuit of FIG. 1 is affected by a capacitance 54 between the input terminal 22 and the reference line 24 and a capacitance 55 between the plate 20 of the reference capacitor 16 and ground. A stray capacitance 56 will appear between the plate 12 of the capacitance transducer 10 and ground, while a stray capacitance 57 will appear across essentially the output terminals of the transducer circuit proper, 24, 30.

As stated above, the unwanted stray capacitances in parallel with capacitive elements in a transducer circuit can be eliminated by shielding, here shown at 60. Usually the shielding 60 would be connected to the reference lead or ground, as shown by the line 62 connected between the shielding 60 and the reference line 24. Although the shielding 60 can eliminate the effects of the stray capacitances 50 and 52, it requires far more sophisticated techniques as taught by the instant invention to cut down the error created by stray capacitances between the various terminals and the reference lead 24, here shown as the stray capacitances 54–57.

The unwanted and error-producing stray capacitances to ground associated with capacitance transducers such as that shown at 10 in FIG. 1 may usefully be segregated into input stray capacitances which appear across the input terminals of the circuit (in FIG. 1, the stray capacitance 54 across the terminals 22, 24), output stray capacitances (In FIG. 1, the stray caapacitance 57 between the leads 30 and 24), and capacitances within the circuit (in FIG. 1, 55 and 56). As one feature of this invention, the effect of the stray input capacitance 54 is nullified by the introduction of the reference capacitor 16 and the operational amplifier 26 into the sensor circuit in such configuration that the sensor capacitor 10 is in the feedback loop around the amplifier 26.

The high-gain or operational amplifier 26 has characteristics of very high-gain, high-input impedance, and low-output impedance. Its open-loop gain may be 5 ×

$10^7$, while input currents would rarely exceed $10^{-10}$ amps and input voltage, $2 \times 10^{-6}$ volts. Thus the terminal 28 is effectively at ground 24, being held within 2 $\mu v$ thereof. This effectively grounds the stray capacitance 54, and to the extent that the terminals 22, 24 are coupled to a low impedance source (usually the case), this shorting effect is even further enhanced.

Turning then to the stray capacitance 57, it can be seen that it is in parallel with the output terminals 30, 24 of the operational amplifier 26. Since the amplifier output impedance is very low, the stray capacitances represented at 57 are simply shorted to ground 24 by a low impedance shunt.

The remaining or internal stray capacitances (in FIG. 1, 55 and 56) can be seen to be essentially in parallel with each other and this can be lumped into one total value, $C_T$. In most capacitance transducer circuits, $C_T$ would at least equal $C_r$ and $C_s$; and often $C_T$ is greater than the sum of $C_r$ and $C_s$. In the circuit of FIG. 1, $C_T$ can be said to be the capacitance between the input terminals 28, 24 of the amplifier 26. Since the voltage across these terminals 28, 24 stays down in the microvolt range, little voltage or current can be developed across $C_T$.

Since practically no current flows through the amplifier 26, the voltage $e_o$ across the output terminals 30, 24 of the amplifier 26 can be found from $E_{in}$ by the operational amplifier gain equation, which is not strictly accurate but is a very close approximation:

$$e_o = Z_f/Z_i \; E_{in} \qquad 1$$

Since $Z_f$ is the impedance of the feedback loop, here $C_s$, and $Z_i$ is the series impedance at the input of the operational amplifier 26, here $C_r$, Equation (1) can be rewritten:

$$e_o = - \; Z_s/Z_r \; E_{in} \qquad 2$$

$$e_o/E_{in} = - \; Z_s/Z_r \qquad 3$$

$Z_s$ and $Z_r$ are the circuit impedances of the capacitors 10 and 16, essentially their reactances $X_s$ and $X_r$. Since $X_s$ and $X_r$ are related to $C_s$ and $C_r$ by the same constant factor if they are operating at the same frequency, $$e_o/E_{in} = - \; C_r/C_s \qquad 4$$

It can be seen from equation (4) that $C_T$ does not figure in the final ratio of $e_o/E_{in}$, mainly because it acts the same on both $C_s$ and $C_r$, being directly coupled to both.

In summary, then, the circuit of FIG. 1 is able to eliminate the stray capacitance effects of all the stray capacitances 54-57 by one means or another, making possible accurate capacitance sensing by the transducer 10. Thus, this invention provides new and useful advances to measurement systems and methods for transducing various parameters into electrical signals by facilitating a transducer system and the techniques and methods associated therewith whereby the disruptive effects of stray impedances may be minimized to facilitate the use of impedance-type and especially capacitance-type devices to perform the transducing function.

As stated above, nearly all instrumentation techniques are directed toward the sensing of linear displacement or of phenomena such as temperature, pressure, force or acceleration which are first converted into a linear displacement before being transducer into an electrical signal. Heretofore the most popular sensor for converting linear displacement into an electrical signal which can be used by display, recording, and transmitting apparatus was the resistance strain gauge, which is simple to use and inexpensive to install on test structures, but which has drawbacks in performing precise instrumentation and testing because its performance is unstable with change in temperature and other conditions and is susceptible to drift.

Since it is thus desirable to transduce linear displacement into an electrical signal using some more accurate type of variable impedance sensor besides the usual resistance strain gauge, and since the natural variable-impedance element for use as a replacement of the resistor is the capacitance sensor or transducer 10, the principles of the invention are highly important toward improving instrumentation accuracy beyond that possibly using strain gauges. The capacitance transducer 10 functions by having the distance between the two capacitor plates 12, 14 changed n response to changes in the parameter to be sensed to vary the reactance $X_s$ or $C_s$ of the transducer 10. Since such a capacitance transducer 10 can thus sense only mechanical movement, it is desirable that whatever physical parameter is to be sensed should operate on the transducer 10 in such manner as to provide some change in the distance between the capacitor plates 12, 14. This can be accomplished in a variety of ways which will be discussed below.

In spite of the adaptability of the capacitance transducer 10 to almost every type of parameter monitoring need, as shown above, such capacitance transducers have not been widely used in the past because of the difficulty associated with the effects of ubiquitous stray circuit capacitance effects such as those shown at 54-57 and also because of the high impedance characteristics of this type of sensor. In other words, previous uses of capacitance transducers have resulted in either poor sensitivity or non-linearity because every lead and terminal of the electrical system in which the capacitance transducer operates acts as a capacitor plate in regard to nearby leads and terminals, so that a less than infinite impedance exists therebetween, especially for high-frequency AC signals. It is the great accomplishment and contribution of the instant invention to provide the capacitance transducer electrical system of FIG. 1 wherein such inaccuracies and distortion of the information to be sensed by the capacitance transducer 10 are eliminated. The main principle in the arrangement of this system is to nullify the effects of the shunt stray capacitances associated with the sensing capacitor 10 in such manner as to make ascertainable the true changes in impedance thereof, which in the past have been almost impossible to derive electrically, by merely sensing the relation $e_o/E_{in}$ or $E_o/E_{in}$, since $E_o$ is merely an attenuated and balanced version of $e_o$.

Basically, the principles of the invention include providing a capacitance transducer electrical system (of which FIG. 1 is a preferred embodiment) which eliminates all the various stray capacitances 50-57 occurring in the circuit, whether between one point in the circuit and another point in the circuit or between a certain point in the circuit and the ground 24, as with 54–57, or in parallel with some element in the circuit, as with 50–52. The stray capacitances 50–52 in parallel with circuit elements such as $C_s$ and $C_r$ can be eliminated simply by proper shielding as at 60, but capacitances like 54–57 occurring between the various leads and terminals in the circuit and ground 24 are far more difficult to deal with.

Accordingly, it is an important principle of the invention that applicant connects the sensor capacitor 10 in a capacitance transducing system between the input and output terminals 28–30 of the high-gain amplifier 26. At the same time the reference capacitor 16 is coupled in series between the input terminal 28 of the operational amplifier and its drive signal source 22, 24 which produces or supplies $E_{in}$. (Of course, the positions of $C_r$ and $C_s$ could be switched without losing the inventive result.) As a result of this arrangement only the current flow through the reference capacitor 16 is important to the accuracy of the output signal $e_o$ of the circuit, so that the stray capacitance 54 between the reference capacitor 16 and the input signal source 22 will be irrelevant to the accuracy of the output reading.

Because the high-gain ampliifer 26 has practically an infinite input impedance, all stray capacitances between the reference capacitor 16, the sensor capacitor 10, and the input terminal 28 of the high-gain amplifier 26 will be in parallel with practically a zero voltage and thus will be effectively shorted to ground or the reference line 24. Finally, the capacitances symbolized at 57 between the output terminal 30 of the amplifier, the second plate 14 of the sensor capacitor 10, and the output terminal 32 of the circuit will be in parallel with the very low output impedance of the high-gain amplifier 26 and thus will be shunted to ground 24. As stated heretofore, a capacitance transducer system constructed according to the principles and schematic of FIG. 1 demonstrated an accuracy within one part in 30,000 even though the stray cacitances 54–57 rose to be almost equal to the sum of $C_s$ and $C_r$.

Figures 2, 3:
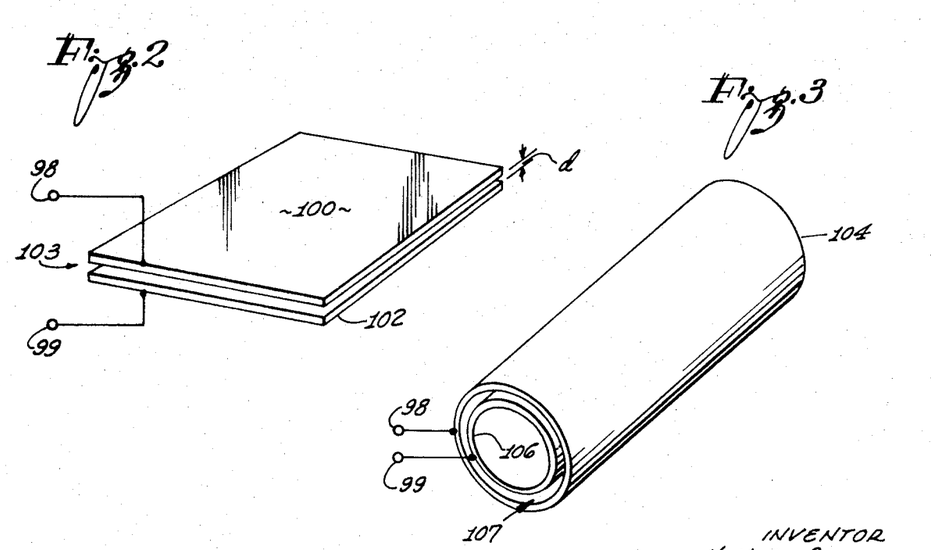
FIG. 2 is a schematic showing the characteristics of a parallel plate capacitor.
FIG. 3 is a schematic showing the characteristics of a concentric cylinder capacitor.

Referring to FIG. 2, one type of capacitance transducer usable in the position 10 ($C_s$) in FIG. 1 is the parallel plate capacitor shown therein, having a first plate 100 and a second plate 102 with electrical leads 98 and 99, respectively, attached thereto. For purposes of illustration, the plates 100 and 102 are shown of identical dimensions $W$ and $b$, with resulting areas A. The value of $C_s$ for this capacitor is then proportioned to $A/d$, and the reactance $X_{cs}$ would be proportional to $d/FA$, where $F$ is the frequency of the applied electrical signal $E_{in}$.

A parallel plate transducer using the arrangement of FIG. 2 would function by varying the effective $d$, upon which the instantaneous value of $C_s$ and $X_{cs}$ depend. Both $F$ and A would remain constant. The effective d would be varied by moving the plates 100 and 102 away from each other, by sliding them relative to each other, or even by changing the dielectric constant of the material in the space 103 between them. For example, temperature sensing might be accomplished by attaching the plates 100 and 102 together with columns of some material having a large temperature coefficient of expansion, while pressure might be measured by forcing one plate away from the other against the bias of a spring (not shown). In like manner, force and acceleration can be expressed or applied to the capacitance transducer of FIG. 2 in such manner as to change the value d so that the plates 100 and 102 "see" a linear displacement. Actual linear displacements can directly be transduced, of course, by moving one of the plates 100, 102 with the displacement while keeping the other plate stationery.

FIG. 3 shows another capacitance transducer using two cylinders 104 and 106 or the like, one surrounding the other, with respective leads 98 and 99. The effective d between them is ½ ($D_{104} - D_{106}$), $D_{104}$ and $D_{106}$ being the diameters of the cylinders 104 and 106 respectively. Where $D_{104}$ and $D_{106}$ are much greater then the effective $d$, $C_s$ will be approximately, though not strictly, proportional to $1/D$, while $X_{cs}$ will vary approximately with $d/F$. The transducer of FIG. 3 could have its effective $d$ ( and thus $C_s$ and $X_{cs}$ ) varied by moving the cylinders 104 and 106 axially relative to one another, or by varying the dielectric constant of the material in the area 107 between the cylinders 104 and 106, or by expanding the outer cylinder 104 while contracting the inner cylinder 106.

Figure 4:
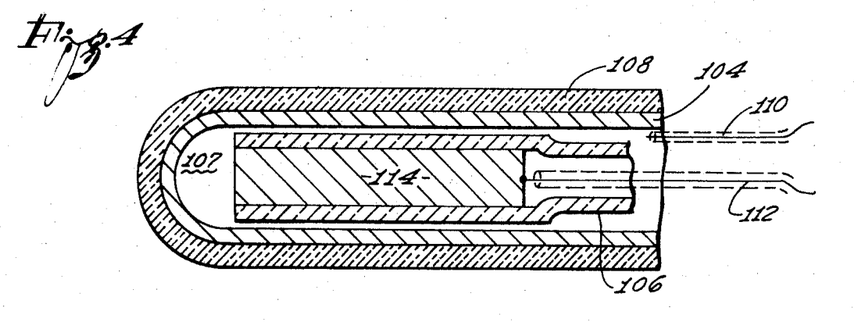
FIG. 4 illustrates the principles of temperature probe construction according to the principles of the instant invention.

In FIG. 4, concentric cylinder arrangement of FIG. 3 has been developed into a transducer for providing a temperature-variable $C_s$ in the portion 10 of FIG. 1. The outer cylinder increases and is contracted as temperature decreases, although conceivably this expansion/contraction function could be performed by the inner cylinder 106. The resulting capcitance temperature probe is sheathed within a layer 108 of insulating material and has first and second electrical leads 110 and 112. The first electrical lead 110 is connected to the outer plate 104, which preferably would be constructed of aluminum or some other metal that is both conductive and highly temperature-expansive. A preferred material for the inner plate 106 is quartz, which has a near-zero temperature coefficient of expansion. Since the plate 106 would not conduct well if made of quartz, the lead 112 in FIG. 4 is shown connected to a conductive film 114 on the outside diameter of the quartz cylinder or plate 106.

Figure 5:
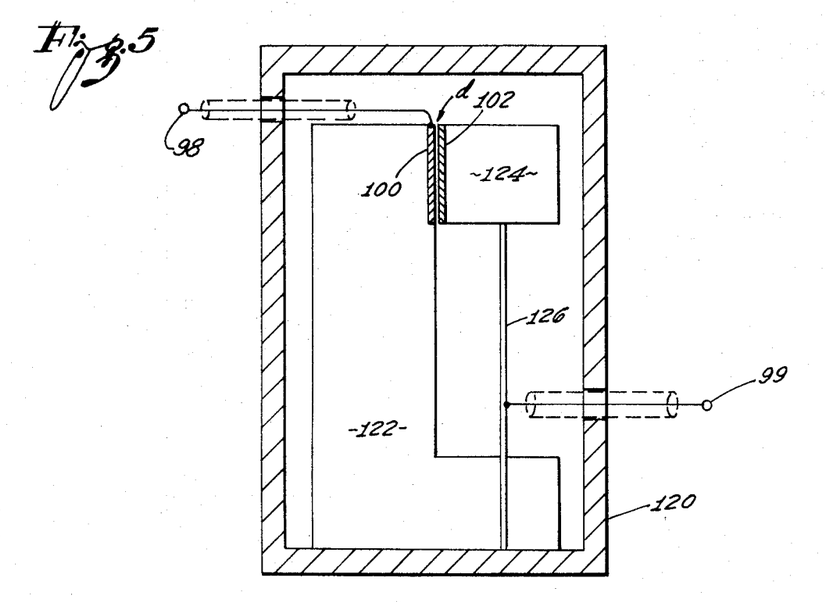
FIG. 5 illustrates a form of accelerometer or a force transducer used for more accurate transducing according to the principles of the instant invention.

FIG. 5 shows an accelerometer or applied force or shock transducer using the parallel plate principle shown schematically in FIG. 2. The transducer is contained within an electrostatic shield 120 through which pass the leads 98 and 99. The plate 100 is imbedded in a quartz frame 122 to assure ruggedness and temperature immunity for the transducer. In order to transduce force, acceleration, or shock, the plate 102 is mounted on a cantilever 126, to which the lead 99 may be attached if the mass 124 and beam 126 are conductive. In the operation of the transducer of FIG. 5, any force or acceleration (including shock) having a vectorial component perpendicular to the plates 100 and 102 will cause the mass 124 to deflect against the neutral position of the beam 126. This will vary the d between the plates 100, 102 by moving the plate 102 relative to the firmly fixed plate 100. This variation in d will cause a variation in the output impedance $X_{cs}$ across the leads 98, 99. In the circuit of FIG. 1, then, the ratio of $C_r/C_s$ will have a new value, and with it, $e_o/E_{in}$. The effect of the transducers of FIGS. 2–4 in the circuit of FIG. 1 is likewise to vary $e_o/E_{in}$ as discussed above.

It should be noted that the above capacitance transducers are far more easily adjustable than most. For example, the transducer of FIG. 5 could have its close-up response constant varied by:

a. Changing the mass of the bob weight,
b. Changing the spring constant of the cantilever beam,
c. Changing the length of the cantilever beam, or
d. Changing the initial clearance between the electrode on the quartz and the bob weight.

(The fact that the bob weight tends to swing in an arc instead of moving in a straight line is not a problem provided the total movement is very small compared to the length of the cantilever beam.)

There are, of course, many variables which can be sensed with similar types of sensors. The precision of each is dependent only on the mechanical excellence. It has already been demonstrated that the capacitance sensing technique is at least one order, and perhaps two orders, of magnitude more precise than existing sensors. Previous sensors were limited by the relatively low stability and sensitivity of such electrical devices as strain gauges, etc.

Figure 6:
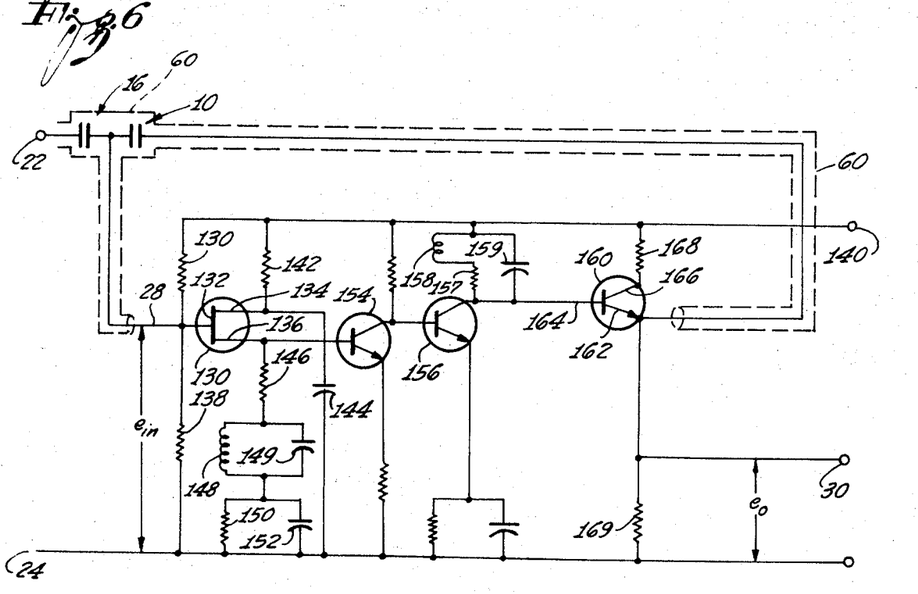
FIG. 6 is a schematic of a high-gain amplifier and the reference capacitor and sensor capacitor connections thereto according to the principles of the instant invention.

Referring to FIG. 6, a preferred circuit embodying the principles of FIG. 1 has the operational amplifier input line 28 connected to the control electrode of a unijunction transistor 130 having an emitter 132 (the control electrode) and two collectors 134 and 136. A biasing resistor 138 couples the emitter 132 to the ground line 24, while another resistor couples the emitter 132 to a power suply terminal 140. In one circuit built and operated according to the schematic of FIG. 6, the power supply 140 was +24 volts DC. The collector 134 of the unijunction 130 is coupled to the power supply 140 through a resistor 142 and to ground 24 through a noise decoupling capacitor 144.

The collector 136 is the output terminal of the unijunction stage of the amplifier 26 and accordingly is connected through a resistor 146 to a tank circuit comprising a parallel inductor 148 and capacitor 149. In the operation of the transducer system of FIG. 6, the tank circuit 148–149 would be tuned to the frequency range of $E_{in}$ such that the tank presented a differential impedance to that frequency range such that the amplifier gain would be high throughout the range. Also, the tank 148–149 would tend to pass all other frequencies to ground 24, thus clearing out harmonics of the fundamental of $E_{in}$ and noise created by the unijunction 30 and its resistors. The tank 148–149 is connected to ground 24 through another DC biasing resistor 150 and its AC by-pass capacitor 152.

The output on the collector 136 is amplified by two conventional transistor stages 154 and 156, following which an RLC circuit comprising the resistor 157 and inductor 158 in series between the amplifier 156 and power supply 140 and a capacitor 159 in parallel therewith perform again the functions performed by the tank 148–149.

An emitter-follower transistor 160 having emitter 162, base 164, and collector 166 provides impedance coupling at the output of the circuit. The base 164 receives the output of the transistor 156 and provides an almost infinite impedance to the circuitry before it, since it has no biasing resistors to provide alternate current paths. The collector 166 is connected through a resistor 168 to the power supply 140, while the emitter 162 is connected through a resistor 169 to the ground line 24.

The output on the emitter 162 of the transistor 160 is the $e_o$ in FIG. 1, between points 30 and 24. As such it is applied as a feedback to the sensor capacitor 10 and is also further processed as necessary to provide the desired form of $e_o$. It is a well-known characteristic of the emitter-follower transistor that its output impedance is very low, so that the desired shunting of the stray capacitance 57 will be assured.

The experimental amplifier of FIG. 6 has an open loop gain of 100,000 and input impedance of 7 megohms, due to its field effect transistor input stage. For a total circuit capacitance of 200 pf (i.e., $C_t + C_s + C_r = 200$), the capacitance network reactance $X_c$ at 10 kc/s is given by $$X_c = 1/2\pi f C$$

$$X_c = 10/(2\pi \cdot 10^4 \times 2 \times 10^6)$$

$$X_c = 80,000 \text{ ohms}$$

This figure is small compared with the 7 megohm input impedance of the amplifier.

The above amplifier was connected into circuit with two capacitors $C_r$ and $C_s$ whose direct capacitance ratio had been measured precisely using a transformer ratio bridge. The calculated closed loop gain of the amplifier agreed within one part in 30,000 of the measured value, even though the stray capacities were about equal to the direct capacities.

FIG. 6 shows the circuit diagram of the amplifier. As can be seen, it has two resonant circuits $L_1$, $C_1$, and $L_2$, $C_2$. The resistors $R_1$ and $R_2$ and the loading effect of $Q_2$ and $Q_4$ modify the amplitude response in such a way that the gain varies only slightly from 7,000 cps to 14,000 cps; and the phase response is such that when 100 percent feedback is applied on the reference and sensor capacitors connected as shown in FIGS. 3a and 3b, the closed loop is quite stable.

Figure 7:
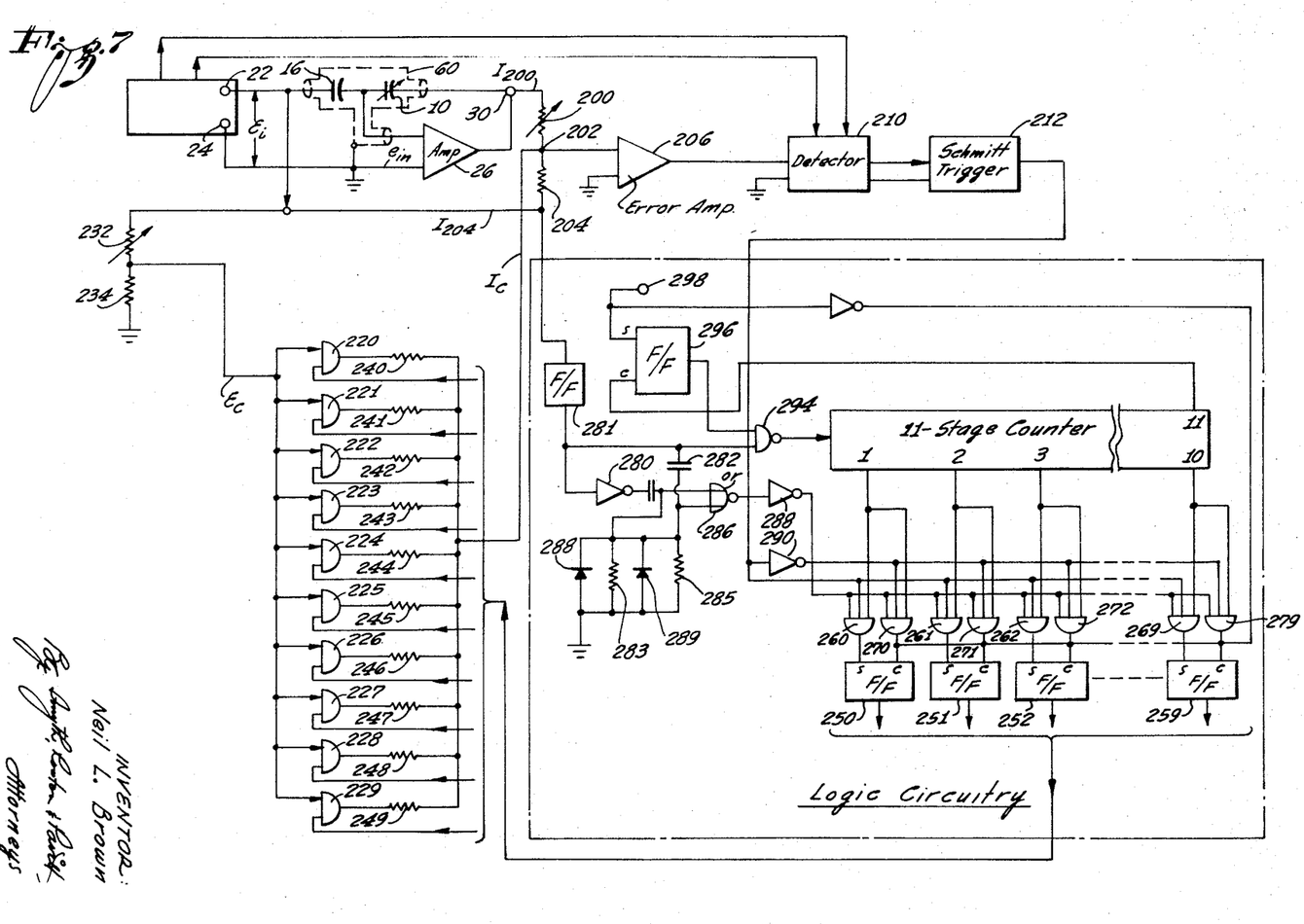
FIG. 7 illustrates a digitalized capacitance transducer system according to the principles of the instant invention.

Referring to FIG. 7, another feature of the instant invention comprises principles for achieving a digital output from the basic inventive capacitance transducer system 10–16–26. Such digitalizing extends the inventive signal $E_o$ from the amplifier 26 compared with $E_{in}$ by applying $E_o$ through an adjustable resistor 200 to a summing point 202 and by applying $E_{in}$ through a resistor 204 to the summing point 202. Prior to test or at some reference condition of $C_s$ 10, the resistor 200 is adjusted such that $I_{200}$ and $I_{204}$, the currents developed by the signals $E_o$ and $E_{in}$ across their respective resistors 200 and 204 are equal. Since $E_o$ is 180° out of phase with $E_{in}$ due to the net phase inversion of three stages of amplification at 26, $I_{200}$ and $I_{204}$ will be opposed and self-cancelling, resulting in a zero "error" signal at the summing point 202, which is the input terminal of an error amplifier 206. Following zero adjustment of the resistor 200 changes in the $C_s$ 10 will create an error input to the amplifier 206 by changing $E_o$ to $\Delta E_o$ and thus shifting the ratio $E_o/E_{in}$ away from the ratio $R_{200}/R_{204}$. Error signals from the amplifier 206 are compared with a reference signal from a source 208 which generates $E_{in}$ in an error detector 210, the error-proportional output of which is applied to Schmitt trigger circuit 212 having positive and negative output states; for example, OV when the error signal from 210 is below a certain detection level and +10 VDC when the error signal from 210 exceeds a certain level. In short, OV at the trigger 212 output represents "no error" and +10 VDC represents "error." Before tracing the utilization of this "error" – "no-error" signal (hereinafter called the ENE) the ultimate purpose for deriving it will be discussed.

The ENE ultimately leads to the digital quantification of $\Delta E_o$ by switching logic circuitry controlling a series of "And" gates 220 and 229 which supply the current components necessary to make up a corrective current $I_c$ which will offset the error at the summing point 202. Each gate 220–229 has as a steady input a portion of $E_{in}$ (herein denoted $E_c$) derived by dividing $E_{in}$ across a variable resistor 232 and a fixed resistor 234. Between each gate 220–229 and the summing point 202 is a resistor 240–250, respectively, so that the opening of one of the gates 220–239 will connect $E_c$ across the associated resistor 240–249 to the summing point 202. Once switched into circuit, a certain component of $I_c$ will then be added to the other currents at the summing point 202, up to the time when $I_{200} + I_{204} + I_c$ no longer adds up to enough error to keep the Schmitt trigger 212 in its "error" state, i.e.— at 10 VDC.

The switchable input to each "And" gate 220–239 is the output state of the gate's control flip-flop 250–259. In a circuit built according to the schematic of FIG. 7, 0V DC at the output terminal of a flip-flop 250–259 would open a gate; +10V DC would close the gate. Opening the gate, of course, would cause the component of $I_c$ available from the gate to flow to 202. The state of each gate 250–259 (i.e.—0V or +10V) can be used to provide either a serial or parallel digital output for the transducer system by circuitry of conventional design not shown or discussed further herein.

Set commands and reset commands to each flip-flop 250–259 are supplied by two groups of three-input "And" gates, numbered 260–269 for the set control and 270–279 for the reset control. The first input to each gate in both groups 260–269 and 270–279 is a steady train of trigger pulses derived by first halving $E_{in}$ at 281 and then coupling $E_{in}$ and its inverse waveform (derived at 280) through RC differentiating networks comprising capacitors 282 and 284, respectively, and the parallel resistors 283 and 285 to the input terminals of an "Or" gate 286. Two diodes 288 and 289 short the negative-going differential spikes of both $E_{in}$ and its inverse to ground, so that a positive-going spike train at the frequency of $E_{in}$ emerges from the "Or" gate 286, following which the pulses may be amplified and inverted at 288 and applied to each of the gates 260–279. Thus, when the gates 260–279 are opened the spikes will trigger the flip-flops 250–259.

A second input to each gate 260–279 is the ENE signal from 212, which is applied directly to the "Set" gates 260–269 and is applied to the "Clear" gates 270–279 after having been inverted at 290. The result is that as long as the ENE is in its "error" state, it will signal the gates 260–269 to pass set pulses from 288, while once the Schmitt trigger 212 is returned to its "no-error" state all the "Clear" gates 270–279 will be signaled to pass set pulses from 288—as far as the ENE signal is concerned.

A third input to each gate 260–279 that must be present if the gate is to open to the pulses from 288 is the output of a counter 292 of conventional design. The counter 292 advances through eleven stages in response to pulses from 281 which are gated to the counter 292 through an "And" gate 294, which is opened by the output of flip-flop 296. The flip-flop 296 signals "Open" to the gate 294 when set by a command signal from a source 298. The command signal from 298 also resets the flip-flops 250–259.

The flip-flop 296 closes the gate 294 when eleven pulses from 281 (at one-half of the frequency of $E_{in}$ have advanced the counter 292 through its first tend states and then triggered the eleventh, which resets the counter 292 and clears the flip-flop 296 until another command signal arrives from 298.

The command signal source 298 can include not only manually actuated "sample" commands but also timed commands or telemeter transmitted commands. Whatever its source, such a command will set the flip-flop 296 so that it opens the gate 294. Thereupon, the ½ $E_{in}$ pulses from 281 will advance the counter 292 through its stages 1–11.

At each of the stages 1–10 of the counter 292 both gates 260–269 and 270–279 of the flip-flop 250–259 associated with the counter stage will get an "Open" signal from the counter, while all other flip-flop gates will be held closed. Thus the counter 292 permits one flip-flop 250–259 at a time to sample ENE from 212 and respond accordingly. If the ENE shows "error" when the counter first reaches that flip-flop, the gates in series 260–269 will be opened to the pulses from 288, which will set the flip-flop. The flip-flop, once set, will hold its "And" gate in series 220–229 open to contribute to $I_c$.

After any flip-flop has been set through opening of its gate in the 260–269 series, one of two events may occur at the Schmitt trigger 212: the ENE signal may remain at "error" or it may be switched to "no-error," the latter because the $I_c$ component switched into the summing point 202 was large enough to offset the error due to $\Delta E_o$. If the ENE should change to NE, the inversion at 290 would cause it to signal the gate in the 270–279 series for the same flip-flop to open, whereupon the next pulse from 288 will clear the flip-flop and thus cut off its contribution to $I_c$.

As an example, immediately after the setting of the flip-flop 296 the counter 292 will be pulsed to stage 1 through 294. The gates 260 and 270 will have "Open" signals from the counter 292. Since the spikes from 288 come at double the frequency of the pulses to the counter 292, the gates 260 and 270 will get two spikes from 288 before the counter leaves for stage 2. If the ENE says "error" when the two spikes from 288 arrive, gate 260 could pass them, but gate 270 could not. This would set flip-flop 250 and leave it in "Set" state. If the ENE had said "no-error," the spikes 288 would have passed through gate 270 but not 260, producing no result because flip-flop 250 would have been already cleared by the start-up reset from 298.

It can be seen, therefore, that the gate 270 will be of significance to flip-flop 250 only if the ENE is "error" for the first pulse from 288 and switches to "no error" for the second pulse, because the setting of 250 caused $I_c$ to reach or exceed the compensation level needed to neutralize the effect of $\Delta E_o$. In such case, the "no error" ENE will gate to the second spike from 288 through 270 to clear flip-flop 250, in effect stating that the $I_c$ through gate 220 was "too much." Thus the 10-bit binary number derives from the states of flip-flops 250-259 would be left zero in its highest position. As the counter 292 ran through the flip-flops to the lowest 259, $I_c$ would have to be formed without the stage 1 component ($I_{c1}$).

It follows from this arrangement, of course, that the $I_c$ components get smaller from stage 1 to stage 10, requiring that the resistors 240–249 get larger. Moreover, the size of all components, $I_{c1}$ to $I_{c10}$ will be governed by the setting of the variable resistor 232, which is in effect in series with each of the resistors 240–249 and would serve as a calibrating adjustment similar to resistor 40 of the analog circuit of FIG. 1.

When the counter 292 has covered all ten stages, the states of the flip-flops 250–259 should form a 10-bit binary number which closely approximates $\Delta E_o$ and the change in capacitance of the $C_s$ 10. Thus applicant has provided a digitalized capacitance transducing system wherein the stray capacitances 54–57 are unable to inject error into the output signal.

The circuit shown in FIG. 1 gives an output $E_o$ which varies linearly with changes in displacement of the electrodes of the sensor capacitor 10. If zero output is required for one particular value of $C_s$, i.e., for one particular value of the sensor output, then the modified network shown in FIG. 1, 34–42, can be used. For zero output at the point 32, the ratio of $R_{34}$ to $R_{36}$ is adjusted to be equal to the ratio of $E_i$ to $E_o$ for the desired value of $C_s$. Since $E_o$ is 180° out of phase with $E_i$, the output at point 38 will then be zero. If $C_s$ subsequently changes, and consequently $e_o$ changes, then $E_o$ changes from zero to a magnitude which is linearly related to the change in $e_o$. The output $E_o$ is applied to the input of a potentiometer 40 such that the resultant output can be adjusted to have any value within the range of adjustment for the maximum change of $C_s$. Thus $R_{40}$ is essentially a "sensitivity" adjustment.

The arrangement shown in FIG. 1 does not have much practical application as it stands for a telemetering deive in that the output is an analog AC voltage proportional to the input $E_i$ and linearly related to the input to the sensor capacitor $C_s$. However, manually balanced readout can be achieved by having $R_{36}$ in the form of an accurately calibrated decade resistor and using an AC null detector at point 38. At balance, 36 will vary linearly with variations in the parameter input to $C_s$.

For a digital readout for use in a telemetry system or the like, it is proposed by the invention to use the basic circuit of FIG. 1 described above, except that balancing would be done using a combination of logic circuitry and AC "And" gates as shown in FIG. 7. That circuit works similarly to the above-described FIG. 1, with resistors 200 and 204 replacing resistors 36 and 34, respectively.

The ratio of $R_{200}$ to $R_{204}$ (there is no current at 202) is equal to the ratio of $E_o$ to $E_i$, i.e., $$R_{200}/R_{204} = E_o/E_i = C_r/C_s \text{ and}$$

$$I_{200} = I_{204}$$

If $C_s$ changes, balance is restored by supplying the additional correction current $I_c$ to the summation point 202. The additional current is supplied by closing the AC "And" gates 220–229 which in turn are connected to the fixed fraction $E_c$ of the input signal $E_i$. Each "And" gate 220–229 then connects $E_c$ to a fixed resistor ($R_{240}$ through $R_{249}$). Each resistor in the $R_{240}$ through $R_{249}$ series has a value twice that of the previous resistor, so by opening or closing the various "And" gates 220–229, the "bridge" about point 202 can be balanced and a digital readout developed. The logic circuit developed to perform this balance operates to close or open the various "And" gates depending on the ene signal at the output of the Schmitt trigger 212. For example, zero volts at 212 would correspond to a "too low" signal, and +10 volts to a "too high" signal, as described above in showing the effect of the ENE on the flip-flop 250.

Three command signals are required and made available from either the bridge circuit or an external source, and are defined as follows:

a. Sample Command 298. A pulse which can be generated manually or a frequency obtained by dividing the clock frequency or a pulse developed by a delay corresponding to the length of time required for the digitizing and transmitting cycle, i.e., continuous operation. This command would initiate the complete sampling cycle and could be scheduled periodically or on command, as the user desires.

b. Clock Pulses Train 294. A square wave whose frequency is less than $E_i$ and which may be obtained by dividing $E_i$ by two.

c. Error Signal. The Schmitt trigger output level or ENE in which a "1" is defined as error condition equivalent to a "too low" $I_c$, and a "0" is defined as the opposite error condition.

The sample command pulse from 298 starts the analog-to-digital conversion by resetting all the output flip-flops 250–259 and setting the control flip-flop 296, which enables clock pulses to the 11-stage counter 292. The clock pulses each advance the counter by one state; and the eleventh pulse, which resets the counter, also terminates the analog-to-digital conversion by resetting the control flip-flop. The clock frequency and its complement are differentiated and "Or"ed at 286 to form a trigger pulse, which occurs twice for each state of the counter.

One individual three-input "And" gate 260–279 is used to drive the "Set" and "Clear" lines of the output flip-flops 250–259. One input to each gate 260–279 is the state of the counter 292, such that State 1 enables the most significant bit, State 2 enables the second most significant bit, etc., and State 10 enables the least significant bit of the digital error data from 202. The Schmitt trigger output ENE enables all of the "Set" inputs 260–269 and its complement enables all of the "Clear" inputs 270–279, such that the output flip-flops are set in the correct state. The trigger pulses which drive all these gates control the transition times.

The timing is therefore controlled such that the first trigger pulse, which occurs several nanoseconds after a particular counter state has been set, sets a flip-flop depending upon the Schmitt trigger ENE output. If this does not change the error condition, the next trigger pulse does nothing, therefore leaving that output flip-flop in the "1" state, thus enabling its AC gate. If, however, the setting of the flip-flop changes the error condition, the second trigger pulse is "steered" by the Schmitt trigger output to reset the output flip-flop, thus disabling its AC gate. The next trigger pulse will occur during the next counter state; thus, the process is repeated ten times, from the most to the least significant bit. The resulting 10-bit binary number stored in the output flip-flops is proportional to the measured parameter. The digital output can be provided in parallel from the output flip-flops at the completion of a digitizing cycle, or the output flip-flops may be configured in a shift register arrangement to provide a serial pulse trainout. The detailed output format may be specified by the user to meet any particular requirement.

The following describes the method that could be used to achieve a frequency output which changes linearly with parametric changes to the input of the sensor capacitor. The method utilizes the characteristics of the oscillator of FIG. 8 and in particular the unique characteristic that its frequency output is a linear function of the ratio of the output to the input voltage of a four-terminal $C_s$ network, shown in block form at 300. In a simple case, the network 300 could be simple Wheatstone bridge capacitance sensors in a form similar to FIG. 1. In the circuit shown in FIG. 8, $E_i$ is the input to the network 300 and $E_o$ is the output. $E_{in}$ is applied through a transformer 302 to both the sensor network 300 and a quadrature network 304. The summed outputs from 300 and 304, $E_o$ and $E_q$, are amplified at 306, phase-shifted at 308, and amplified again at 310 before being applied to the input of the transformer 302. Thus, the simplified schematic of FIG. 8 forms an oscillator circuit. It consists of the two amplifiers, the simple phase-shifting network, the coupling transformer, the quadrature network, and, of course, the sensor network. The quadrature network output voltage ($E_q$) phase is shifted 90° with respect to its input $E_{in}$. The sensor output voltage $E_o$ is usually zero at the midrange value of the parameter being sensed, in phase for the values of the parameter above the midrange values, and 180° out of phase for lower values.

Figure 8:
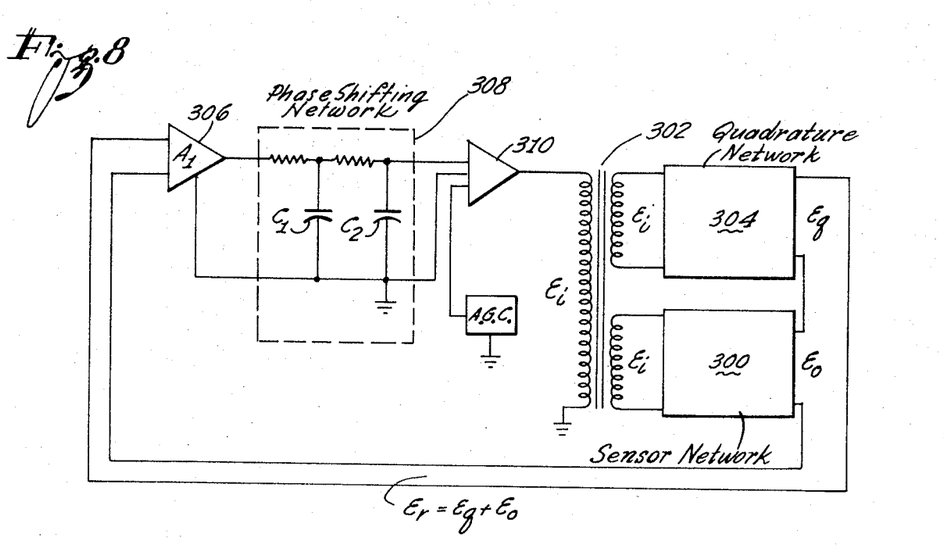
FIG. 8 is a schematic of a preferred form of the frequency-modulation circuit for use in the capacitance transducing system of the instant invention.

The sum ($E_r$) of the quadrature voltage ($E_q$) and the sensor voltage ($E_o$) are applied to the input amplifier 306 ($A_1$), thus forming a complete loop, which will oscillate at a frequency where the sum of phase shift between $E_i$ and the resultant $E_r$ of the quadrature network and the sensor network and the phase shift between the input and the outputs of the phase-shifting network totals 180°. As the sensor output voltage $E_o$ magnitude changes due to the sensed variable, the phase angle of the resultant voltage ($E_r$) will shift in phase accordingly. This in turn will cause the oscillator frequency to change such that this change in phase is offset by an equal and opposite change in phase through the phase-shifting network 308.

The sensitivity of the oscillator of FIG. 8; that is, its percentage change in frequency for a given change in the output of the sensor network 300, can be adjusted quite readily to cover a wide range of sensor sensitives. If the quadrature voltage $E_q$ is reduced in relation to the output voltage $E_o$ of the sensor network, then a larger change in phase will occur for a given change in the output voltage of the sensor network. Thus, a larger change in the frequency deviation of the oscillator will occur. If $E_q$ is made small enough, changes in the output of the sensor network as small as 1 percent of its input will shift the oscillator over a range of 2 to 1 in frequency. This is by no means a theoretical limit, but a value which is characteristic of test units built according to the principles of FIG. 8.

Although this invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

I claim as my invention:

1. In combination,
a variable capacitor having first and second plates movable relative to each other in such manner as to vary the capacitance of the variable capacitor,
a high-gain amplifier coupled in parallel with the variable capacitor,
means for imparting motion whereby the plates of the variable capacitor move relative to each other in response to the change in a parameter to be measured by the variable capacitor,
an input power supply coupled to the variable capacitor, and
a readout device coupled to the variable capacitor.

2. In combination,
a variable capacitor having first and second plates movable relative to each other in such manner as to vary the capacitance of the variable capacitor,
a reference capacitor coulped in series with the variable capacitor,
an AC input power supply coupled in series with the variable capacitor and the reference capacitor,
a high-gain amplifier coupled in parallel with the variable capacitor,
means for applying a fluid, the pressure of which is to be measured, to the plates of the variable capacitor to cause said plates to move relative to each other in response to the change in the pressure to be measured by the variable capacitor, and
a readout device so connected as to sense variations in the capacitance of the variable capacitor and calibrated to derive therefrom readings related to the pressure to be measured by the variable capacitor.

3. In combination,
a variable capacitor,
a reference capacitor coupled in series with the variable capacitor,
electrostatic shielding arranged to surround the variable capacitor and the reference capacitor and connected to shunt stray capacitances therefrom to ground,
means for imparting motion whereby the plates of the variable capacitor move relative to each other in response to the change in a parameter to be measured by the variable capacitor,
an input power supply coupled in series with the variable capacitor and the reference capacitor,
a high-gain amplifier coupled in parallel with the variable capacitor, and
a readout device so connected as to sense variations in the capacitance of the variable capacitor and calibrated to derive therefrom readings related to the change in parameter to be measured by the variable capacitor.

4. In combination for measuring a parameter,
a variable capacitor having first and second plates movable relative to each other in such manner as to vary the capacitance of the variable capacitor, said plates being constructed of different materials having different temperature coefficients of expansion and being so mounted relative to one another that the plates of the variable capacitor will move relative to each other in response to the change in the temperature to be measured by the variable capacitor,
a reference capacitor coupled in series with the variable capacitor, an AC input power supply coupled in series with the variable capacitor and the reference capacitor to provide an input voltage, a high-gain operational amplifier coupled in parallel with a particular one of the variable and reference capacitors and in series with the other one of the variable and reference capacitors to provide an output voltage, and a digital readout device connected to sense variations in the value of the variable capacitor relative to the value of the reference capacitor and calibrated to derive therefrom readings related to the change in parameter to be measured by the variable capacitor in accordance with the relative values of the input voltage and the output voltage from the operational amplifier.

* * * * *